US009740766B2

(12) United States Patent
Arana (10) Patent No.: US 9,740,766 B2
(45) Date of Patent: Aug. 22, 2017

(54) METHODS AND SYSTEMS OF PLAYING MULTI-SOURCE MEDIA CONTENT

(71) Applicant: Disney Enterprises, Inc., Burbank, CA (US)

(72) Inventor: Mark Arana, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 111 days.

(21) Appl. No.: 14/173,774

(22) Filed: Feb. 5, 2014

(65) Prior Publication Data
US 2015/0220620 A1 Aug. 6, 2015

(51) Int. Cl.
*G06F 7/00* (2006.01)
*G06F 17/30* (2006.01)
*H04N 21/43* (2011.01)
*H04N 21/462* (2011.01)
*H04N 21/4627* (2011.01)

(52) U.S. Cl.
CPC ... *G06F 17/30619* (2013.01); *H04N 21/4307* (2013.01); *H04N 21/4622* (2013.01); *H04N 21/4627* (2013.01)

(58) Field of Classification Search
None
See application file for complete search history.

(56) References Cited

U.S. PATENT DOCUMENTS

| 5,894,320 A * | 4/1999 | Vancelette | H04N 5/4401 348/E5.004 |
| 6,546,190 B1 * | 4/2003 | Phillips | H04N 5/9267 386/201 |
| 8,634,030 B2 * | 1/2014 | Hale | H04N 7/15 348/460 |

(Continued)

FOREIGN PATENT DOCUMENTS

EP 2611051 A1 7/2013

OTHER PUBLICATIONS

Anonymous (Last Edited by Ned Scott), "XBMC Quick Start Guide", Internet Citation, Dec. 3, 2011, pp. 1-6, URL: http://wiki.xbmc.org/index.php?title+xBMC_Quick_Start_Guide&oldid+30405.

(Continued)

*Primary Examiner* — Uyen Le
(74) *Attorney, Agent, or Firm* — Sheppard, Mullin, Richter & Hampton LLP (57) ABSTRACT

Methods and systems described herein play multi-source media content. A multi-source media content includes digital assets from multiple media sources. The digital assets may include a video digital asset, an audio digital asset, or a textual digital asset. The digital assets may be provided by different media content providers. The digital assets from multiple media sources may be played such that various components (e.g., a video component, an audio component, or a textual component) of a media content are synchronized. When a digital asset or a digital asset segment for a (Continued)

media content is retrieved from a media content provider into the domain, an index is created to associate the digital asset with the media source from which the digital asset or the digital asset segment may be retrieved. As such, a media content may be played without retrieving, from a media content provider, those digital assets or digital asset segments already existing in the domain.

16 Claims, 6 Drawing Sheets

(56) References Cited

U.S. PATENT DOCUMENTS

| | | | | |
|---|---|---|---|---|
| 2008/0046099 | A1* | 2/2008 | Belmont | H04N 5/44543 700/11 |
| 2008/0085099 | A1* | 4/2008 | Guihot | G11B 27/10 386/201 |
| 2008/0209482 | A1 | 8/2008 | Meek et al. | |
| 2010/0306428 | A1* | 12/2010 | Jackson | G06F 1/16 710/72 |
| 2010/0319037 | A1* | 12/2010 | Kim | H04N 21/2383 725/81 |
| 2012/0151391 | A1* | 6/2012 | Bhatia | G06F 17/30864 715/764 |
| 2013/0060911 | A1* | 3/2013 | Nagaraj | H04N 21/23432 709/219 |
| 2013/0169869 | A1 | 7/2013 | Demoulin et al. | |
| 2014/0344700 | A1* | 11/2014 | Kane | G11B 27/031 715/726 |
| 2015/0154452 | A1* | 6/2015 | Bentley | G06K 9/00711 386/201 |

OTHER PUBLICATIONS

European Patent Office, Extended European Search Report, Jun. 12, 2015, pp. 1-8.

European Patent Office, Article 94(3) EPC, dated Mar. 15, 2016, pp. 1-4.

* cited by examiner

METHODS AND SYSTEMS OF PLAYING MULTI-SOURCE MEDIA CONTENT

TECHNICAL FIELD

The present application relates generally to digital media, more particularly, some embodiments relate to methods and systems of playing media content having digital assets from multiple media sources.

DESCRIPTION OF THE RELATED ART

Digital distribution is the delivery of media content (e.g., audio, video, software, or video games) without the use of physical media. Digital distribution has become ubiquitous and bypassed conventional physical distribution methods (e.g., paper, CDs, or DVDs) due to the advances in computer networking and communication technologies. Nevertheless, delivery of media content is subject to many factors such as the network condition. For example, changes in network bandwidth, transmission delays or packet loss may affect the distribution and/or delivery of the media content.

BRIEF SUMMARY OF THE APPLICATION

According to various embodiments of the application, methods and systems described herein play multi-source media content. A multi-source media content includes digital assets from multiple media sources. The digital assets may include a video digital asset, an audio digital asset, or a textual digital asset. The digital assets from multiple media sources may be played such that various components (e.g., a video component, an audio component, or a textual component) of a media content are synchronized. In various embodiments, the digital assets are provided by different media content providers. In some embodiments, the media content may be played without downloading those digital assets that already exist in the domain.

In one embodiment, when a digital asset for a media content is retrieved from a media content provider onto the domain, an index is created to associate the digital asset with the domain location onto which it is retrieved. The digital asset may be retrieved onto a device from which the request is made. The digital asset may also be retrieved onto a system, from which a device may obtain the digital asset. In various embodiments, an index such as a manifest file may be created to log the association of the digital asset with the domain location. The index may be distributed among all devices of a domain. In further embodiments, the index may be created and maintained to associate a digital asset segment and the domain location where the digital asset segment may be retrieved, in cases when a digital asset is retrieved in segments. The digital asset segment already existing in a domain need not be retrieved from a media content provider when playing back the media content.

Other features and aspects of the application will become apparent from the following detailed description, taken in conjunction with the accompanying drawings, which illustrate, by way of example, the features in accordance with embodiments of the application. The summary is not intended to limit the scope of the application, which is defined solely by the claims attached hereto.

BRIEF DESCRIPTION OF THE DRAWINGS

The present application, in accordance with one or more various embodiments, is described in detail with reference to the following figures. The drawings are provided for purposes of illustration only and merely depict typical or example embodiments of the application. These drawings are provided to facilitate the reader's understanding of the application and shall not be considered limiting of the breadth, scope, or applicability of the application. It should be noted that for clarity and ease of illustration these drawings are not necessarily made to scale.

The figures are not intended to be exhaustive or to limit the application to the precise form disclosed. It should be understood that the application can be practiced with modification and alteration, and that the application be limited only by the claims and the equivalents thereof.

DETAILED DESCRIPTION OF THE EMBODIMENTS OF THE APPLICATION

Conventionally, when a user accesses the same media content using different devices, the full digital assets of a media content (e.g., the video, the audio, the alternate audio, the captions, etc.) need to be re-downloaded onto each device from a media content provider, as requested. Even in an optimized state, the user may still need to re-download one or more discrete digital assets of the media content in order to playback the media content. The process consumes network bandwidth and may be time consuming as one or more discrete digital assets need to be re-downloaded from one or more media content providers. As a result, the instantaneous playback of media content can be optimized.

Before describing the application in detail, it is useful to describe an example environment in which the application can be implemented. One such example is illustrated in FIG. 1.

Figure 1:
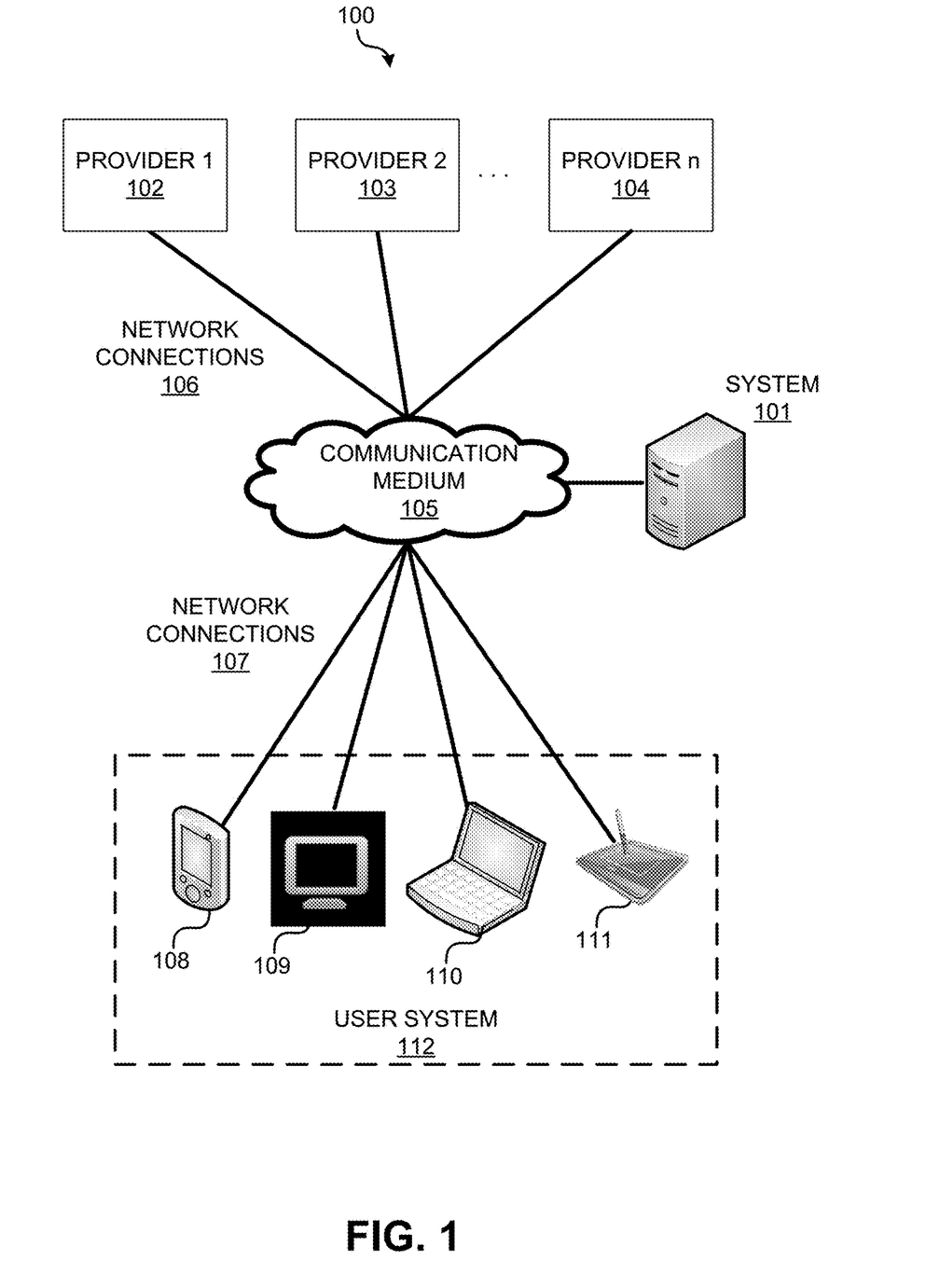
FIG. 1 illustrates an exemplary environment where various embodiments may be implemented.

FIG. 1 illustrates an exemplary environment 100 where various embodiments may be implemented. The environment 100 comprises various user devices 108-111, which may be collectively referred to as a user system 112 connected via a communication medium 105. A media content may comprise a set of digital assets such as a video file having a video content, an audio file having an audio content, or a textual file having an textual content such as a subtitle, closed captions, or a comment. The video content and/or the audio content may be at different qualities, and the subtitle may be in various languages.

In some embodiments, the communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

As shown, a user system 112 may include a smartphone 108 (e.g., iPhone®), a TV 109, a computer 110 (e.g., a personal computer), and/or a tablet 111 (e.g., iPad®), through their respective network connections 107, can either interact directly or indirectly with the various media content providers 1-n 102-104, via their respective network connections 106. For example, a network connection 106 or 107 may include wired connections (e.g., Digital Subscriber Line (DSL), optical) and/or wireless connections (e.g., Wi-Fi.) In various embodiments, a network connection 106 or 107 may include an ad hoc network, an intranet, an extranet, a virtual private network (VPN), a local area network (LAN), a wireless LAN (WLAN), a wide area network (WAN), a portion of the Internet, a portion of the Public Switched Telephone Network (PSTN), a cellular telephone network, or any combination thereof. A network connection 106 or 107 needs not necessarily be the same throughout the environment 100. Various user devices 108-111 described herein may be implemented using the example computer system illustrated in FIG. 6.

In one embodiment, a multi-source media content play platform may be hosted by a multi-source media content play system 101 in FIG. 1, which is coupled to the communication medium 105. The multi-source media content play system 101 may manage playing of the multi-source media content among various devices 108-111 of the user system 112. For example, the multi-source media content play system 101 may log various digital assets played by different devices of the user system 112. When a user requests a digital asset that has been previously played at another device, the multi-source media content play system 101 may coordinate playing the digital asset between the previous and the present devices. Furthermore, the multi-source media content play system 101 may coordinate playing digital assets from different media sources on a device of the user system 112. Various digital assets from different media sources may be displayed in synchronization on a device of the user system 112. In one embodiment, these digital assets being displayed on the device are provided by different media content providers. A device of the user system 112 or a media content provider of the media content providers 1-n 102-104 may be a media source. As such, a media content having various digital assets from different media sources could be played as requested, and the user has no need to re-download an existing digital asset from a media content provider.

In various embodiments, the user system 112 can display any interface related to playing various media content. For example, the user system 112 may be configured to retrieve a digital asset, to receive a digital asset request from a user, to provide information regarding the digital asset retrieved, to monitor all the digital assets retrieved by the user, to play a digital asset, and/or to log a license (e.g., a digital rights management) for a digital asset. In one embodiment, a user may download a client component of a multi-source media content play system 101 such as a multi-source media content play application. The client component may be executed locally at the user system 112. In some embodiments, the multi-source media content play system 101 may provide back-end support for the client component. The multi-source media content play system 101 may be responsible for retrieving various digital assets from different providers 102-104, obtaining a license for a digital asset, associating the license with the digital asset, registering various devices 108-111 of a user system 112, and providing digital assets to one or more user devices of the user system 112.

Figure 2:
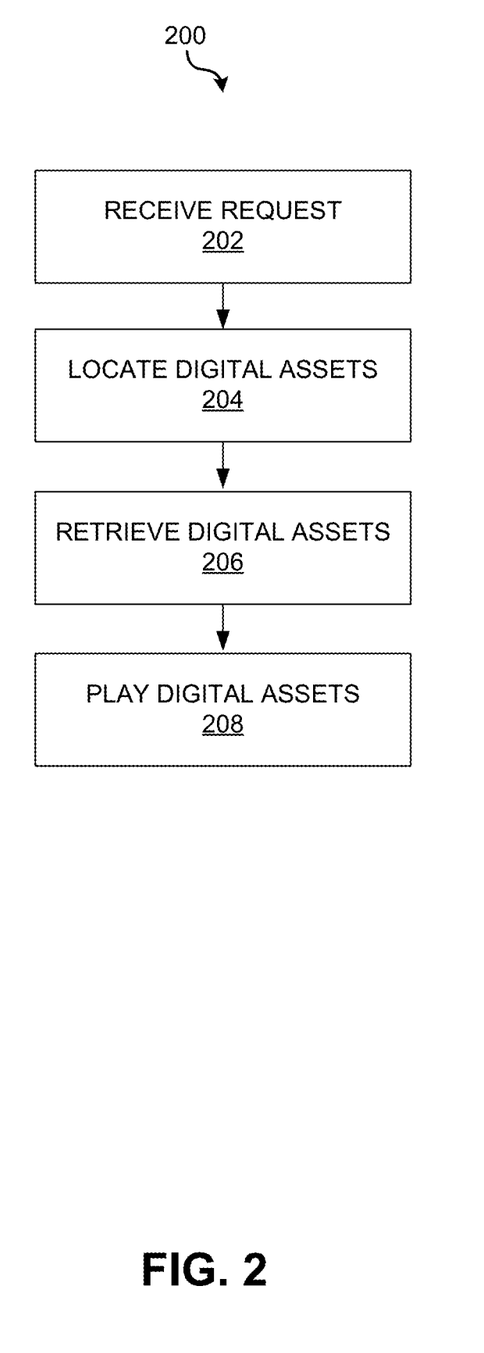
FIG. 2 is a flow diagram illustrating an exemplary method of playing back media content, such as for the multi-source media content play system in FIG. 1.

FIG. 2 is a flow diagram illustrating an exemplary method 200 of playing multi-source digital assets, such as for the multi-source media content play system 101 in FIG. 1. At step 202, a request for a media content is received. The requested media content comprises digital assets from multiple media sources. A media content provider or a device (e.g., a TV, a DVD player, a hard drive, a satellite receiver, etc.) may be a media source. The media content, as requested, includes a combination of digital assets which may be obtained from different media sources. The combination of digital assets may be unavailable at any media content provider.

At step 204, the digital assets included in the media content, as requested, are located. In various embodiments, digital asset(s) included in the media content may be identified and each digital asset may be located. The media sources from which the digital assets may be retrieved are determined. For example, a media source may be a device (e.g., a TV, a data storage device such as a hard drive or a flash drive, a DVD player, a mobile phone, a tablet, etc.) that resides on the domain or a media content provider, that provides the digital asset, may be determined. In one embodiment, a digital asset may be looked up from the domain in which the device requesting the digital asset resides. A domain organizes a set of devices owned by the same entity (e.g., a household, a corporation, etc.) and is defined by an access point such as a gateway (e.g., a cable modem, a DSL modem, a wireless router, a network switch, a wireless access point, etc.), or a cloud access (e.g., a user name and password combination).

In various embodiments, each digital asset retrieved onto the domain is registered. Digital assets may be retrieved in response to a user's request. The digital assets may be downloaded onto the device from which the user makes the request. Alternatively, the digital assets may be downloaded onto a system that distributes the digital assets to the device from which the user makes the request. For example, when a user requests to watch a movie on his or her laptop, the suite of digital assets including the video content, the audio content, and the subtitle, if any, may be downloaded onto the laptop. The movie may be downloaded to a system from which the device may stream the movie. A set of digital assets included in the media content may be retrieved from different providers. Each digital asset may be DRM-restricted. That is, after each digital asset is retrieved from a provider, replication of the digital asset is restricted such that only the devices of a given domain may access the digital asset A digital asset may be registered by associating the digital asset with a media source from which the digital source may be retrieved. For example, when a digital asset is retrieved into a domain from a media content provider, the digital asset may be associated with the device onto which it is retrieved. Alternatively, a digital asset may also be associated with the system onto which it is retrieved. In various embodiments, an index logging the association of a digital asset and the corresponding media source (e.g., the ID of the media source, the domain location of a media source, etc.) from which it may be retrieved is created. In one embodiment, the digital asset is associated with the MAC address of the media source. In further embodiments, all devices of the domain may be identified, and the index may be distributed among all the devices identified. Each of these devices may be a media source. In one embodiment, the index may be a manifest file.

Still referring to step 204, each digital asset included in the media content that is requested at step 202, may be looked up in the index. The index may include the association of the digital asset and the corresponding media source from which the digital asset may be retrieved. If the digital asset cannot be located in the domain, the digital asset may be retrieved from a media content provider. In various embodiments, a preferred media source may be determined when multiple media sources having the digital asset are identified. The preferred media source may be determined according to various pre-determined factors such as the cost, the bandwidth, or the preferred media content provider.

At step 206, each digital asset included in the media content requested is retrieved from a media source. The digital asset, if located in the domain, may be retrieved from the device where it is stored. If the digital asset does not exist in the domain, the digital asset may be retrieved from a media content provider. In various embodiments, all digital assets included in a media content are retrieved from the respective media source at step 206. The assets may be delivered separately.

Subsequently, at step 208, all the digital assets included in the media content are played. The digital assets are played in synchronization. In various embodiments, each digital asset includes a time code and all the digital assets for the media content requested are played according to a reference time code such that various components of the media content are played in synchronization. For example, the video component, the audio component, and the textual component of a movie are played synchronously. In one embodiment, these digital assets being played on the device are provided by at least two different media content providers. For example, a digital asset may be retrieved from a DVD, which is the media source from which the digital asset is retrieved. This digital asset is provided by the media content provider which provides the DVD. In further embodiments, any additional digital assets may be identified, located, and retrieved while the digital assets retrieved at step 206 are being played at step 208. For example, while a movie is being played, a user may choose to turn on a subtitle. In response to this request, one or more digital assets corresponding to the subtitle may be located and retrieved from one or more media sources. The digital assets corresponding to the subtitle may be played in synchronization with the other digital assets that already are being played for the movie.

Figure 3:
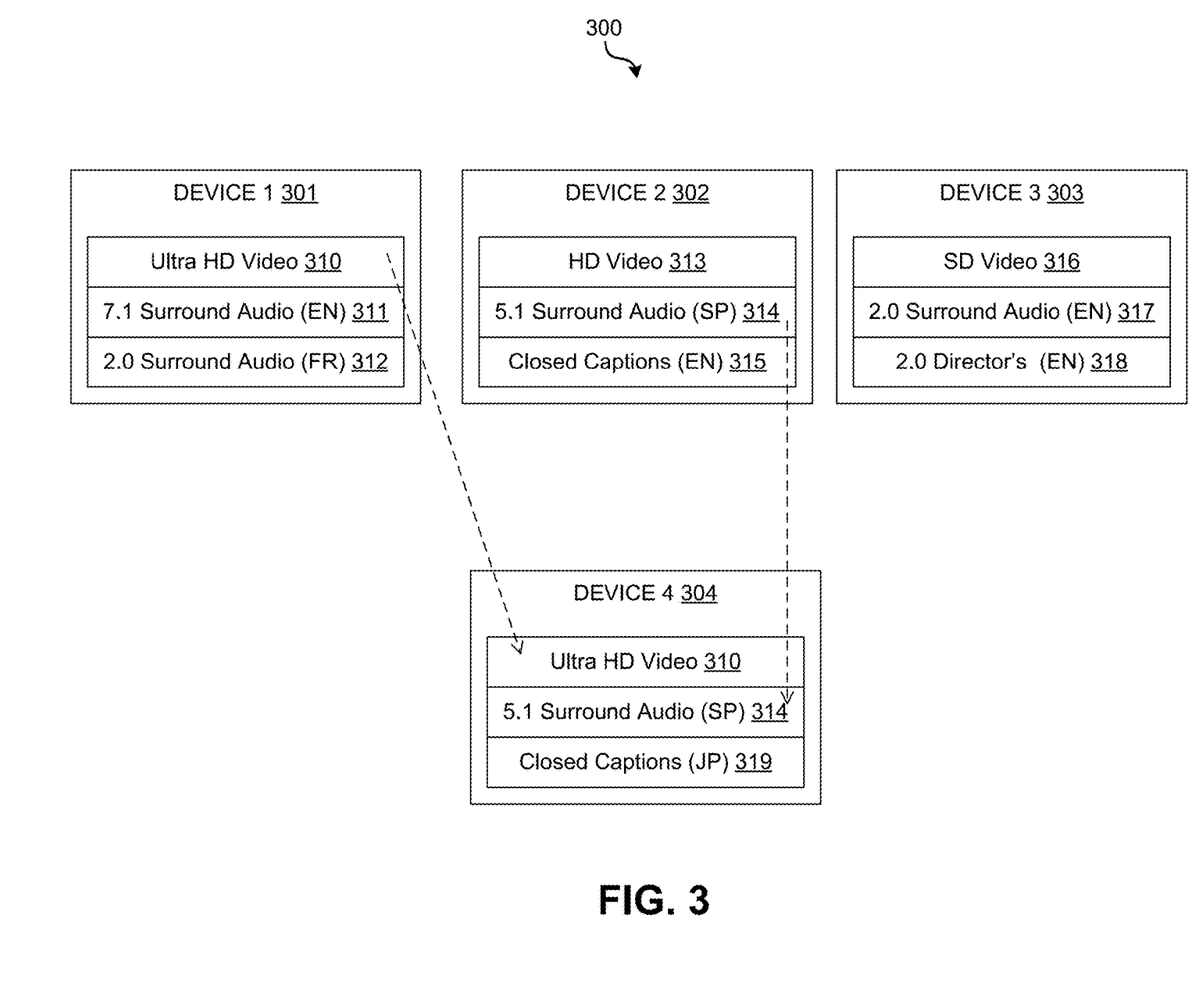
FIG. 3 illustrates an exemplary system of playing media content among various devices, such as the user system in FIG. 1.

FIG. 3 illustrates an exemplary system 300 of playing media content among various devices 301-304, such as the user system 112 in FIG. 1. The devices 301-304 belong to the same domain. The device 301 may be a smart TV or a setup box where the ultrahigh definition (also called "Ultra HD" or "UHD" or 4K UHD or 8K UHD) version of a media content is played. The Ultra HD version of the media content includes the digital assets such as an Ultra HD video 310, a 7.1 surround sound audio in English 311, and a 2.0 surround sound audio in French 312. The device 302 may be a laptop where a full HD version of the media content is played. The full HD version of the media content includes the digital assets such as the HD video 313, a 5.1 surround sound audio in Spanish 314, and a closed caption in English 315. In addition, the device 303 may be a tablet where a standard version of the media content is played. The standard version of the media content includes a standard video 316, a 2.9 surround sound audio in English 317, and a 2.0 surround sound audio of the director's commentary in English 318. The digital assets 310-318 may be retrieved from a set of providers, and each of the digital assets may be DRM-ed. That is, playing back the digital asset requires a DRM, which may be unique to a media content provider or a digital asset. The DRM may also be operating system dependent.

In various embodiments, an index logging the association of each digital asset and the corresponding a media source (e.g., a device and/or a media content provider) is created. In one embodiment, each device in a domain keeps a copy of the index. Each device may create and update an index upon receiving a digital asset. Whenever an index is created or updated, the most up-to-date index may be distributed among all devices in the domain. All the devices may update their local copy of the index according to the most up-to-date index that is distributed. In another embodiment, a domain coordinator maintains a copy of the index. The domain coordinator may be a device in the domain, or a system (e.g., the multi-source media content play system 101 in FIG. 1) that monitors the media content of a domain. Devices other than the domain coordinator in the domain does not keep a copy of the index. A non-domain coordinator device may report to the domain coordinator that a digital asset is received, and the domain coordinator may update the index using this information. In the illustrated example, the index comprises information regarding the media sources from which the digital assets 310-318 may be obtained.

In the illustrated system 300, the device 304 is another TV where a version of the media content is requested. The requested version includes digital assets such as an Ultra HD video 310, a 5.1 surround sound audio in Spanish 314, and a closed caption in Japanese 319. Each digital asset that is requested may be looked up in the domain. In one embodiment, the device 304 may look up the requested digital asset in its local copy of the index. The device 304 determines that the device 301 has a copy of the Ultra HD video 310, and the device 302 has a copy of the 5.1 surround sound audio in Spanish 314, but the closed caption in Japanese 319 does not exist within the domain. The device 304 retrieves (e.g., downloads or streams) the Ultra HD video 310 from the device 301 and the 5.1 surround sound audio in Spanish from the device 302. In one embodiment, the Ultra HD video 310 and the 5.1 surround sound audio in Spanish 314 are provided by different media content providers. The device 304 further retrieves (e.g., downloads or streams) the closed caption in Japanese 319 from a media content provider. The index may be updated to indicate that the closed caption in Japanese 319 may be obtained from the device 304.

In the illustrated example, the digital assets 310, 314, and 319 are retrieved from different media sources: the device 301, the device 302, and a media content provider. The digital assets including the Ultra HD video 310, the 5.1 surround audio in Spanish 314, and the closed captions in Japanese 319 are played synchronously at device 304 to deliver the media content as requested by the user. These digital assets may be played according to a reference time such that the video component (the digital asset Ultra HD video 310), the audio component (the digital asset 5.1 surround audio in Spanish 314), and the textual component (the closed captions in Japanese 319) are synchronized when the device 304 plays the requested media content. Additional digital assets, on a needed basis, may be identified when the media content continues to be played on the device 304. The digital assets may be located and retrieved from various media sources and being played in synchronization with the digital assets 310, 314, and 319.

Figure 4:
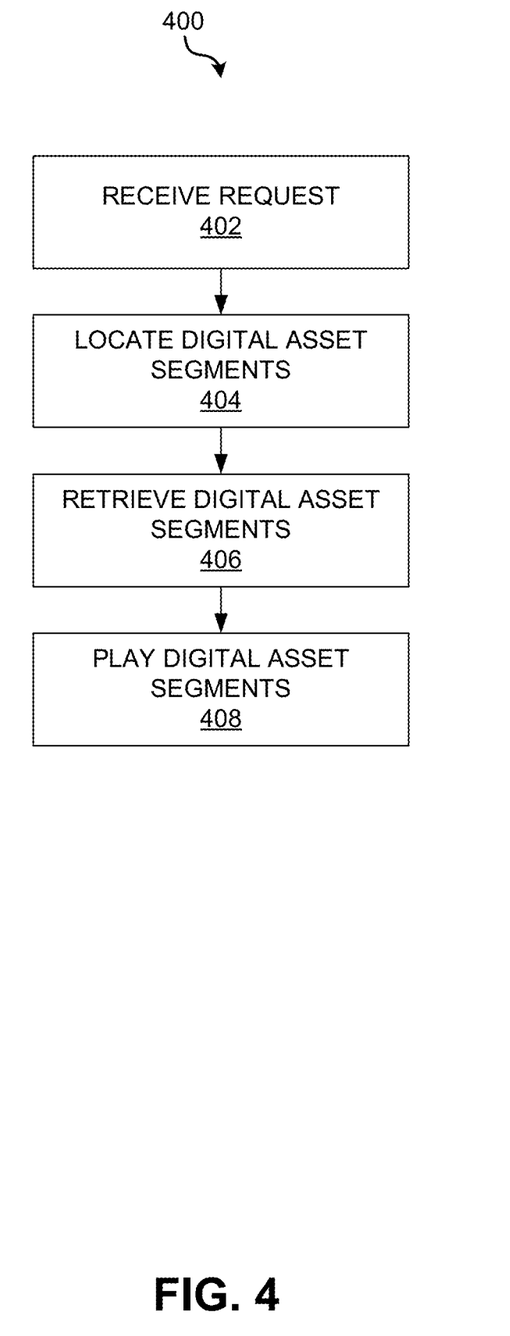
FIG. 4 is a flow diagram illustrating an exemplary method of playing multi-source media content, such as for the multi-source media content play system in FIG. 1.

FIG. 4 is a flow diagram illustrating an exemplary method 400 of playing digital assets, such as for the multi-source digital content play system 101 in FIG. 1. At step 402, a request for a media content is received. The requested media content comprises digital assets from multiple media sources. In various embodiments, a digital asset may be retrieved in segments. For example, when a user requests a high resolution version of a video content (e.g., an Ultra HD video), the high resolution video, which is a digital asset, may be retrieved in segments. Each digital asset segment may be retrieved from a digital asset provider. In some cases such as when the network bandwidth changes, a lower-resolution copy of the video content may be retrieved instead of the high resolution copy to provide an uninterrupted delivery of the media content to the user. As such, a digital asset segment (i.e., the lower-resolution video) that is different from the high-resolution digital asset segment is retrieved.

At step 404, the digital assets included in the media content, as requested, are located. Various digital asset segments related to the digital asset may be identified. Each digital asset segment may be located. The media sources from which the digital asset segments may be retrieved are determined. For example, a media source may be a device (e.g., a TV, a data storage device such as a hard drive or a flash drive, a DVD player, a mobile phone, a tablet, etc.) that resides on the domain or a media content provider, that provides the digital asset segment, may be determined. In one embodiment, a digital asset segment may be looked up from the domain in which the device requesting the media content resides.

In various embodiments, each digital asset segment retrieved onto the domain is registered. Digital asset segments are retrieved in response to a user's request. Digital asset segments may be downloaded onto the device from which a user makes the requests or onto a system that distributes the digital assets to the device from which the user makes the request. For example, when a user requests to watch the Ultra HD video of a movie on his or her laptop, a set of Ultra HD and other resolution video segments may be downloaded to the laptop. Alternatively, the set of video segments in Ultra HD and other resolution may be downloaded to a system from which the device may stream the movie. In various embodiments, the set of digital asset segments may be retrieved from different providers. Each digital asset segment may be DRM-restricted.

At step 404, each digital asset segment retrieved from the provider(s) is registered. A digital asset may be registered by associating the digital asset with a media source from which the digital source may be retrieved. For example, when a digital asset segment is retrieved into a domain from a media content provider, the digital asset segment may be associated with the device onto which it is retrieved. Alternatively, a digital asset segment may also be associated with the system onto which it is retrieved. In various embodiments, an index logging the association of a digital asset segment and the corresponding media source (e.g., the ID of the media source, the domain location of a media source, etc.) from which it may be retrieved is created. In one embodiment, the digital asset segment is associated with the MAC address of the media source. In further embodiments, all devices of the domain may be identified, and the index may be distributed among all the devices identified. Each of these devices may be a media source. In one embodiment, the index may be a manifest file.

In various embodiments, each digital asset segment may be looked up in the index including the association of the digital asset segment and the corresponding media source from which the digital asset segment may be retrieved. If the digital asset segment cannot be located on the domain, the digital asset segment may be retrieved from a media content provider. In various embodiments, a preferred media source may be determined when multiple media sources having the digital asset segment are identified. The preferred media source may be determined according to a user's specification (e.g., the cost, the bandwidth, the preferred media source, etc.)

At step 406, the digital asset segments are retrieved from a media source. A digital asset segment, if located in the domain, may be retrieved from the device where it is stored. If the digital asset segment cannot be located in the domain, it may be retrieved from a media content provider. In various embodiments, all the digital asset segments included in a media content are retrieved from the respective media source at step 406.

Subsequently, at step 408, all the digital asset segments included in the media content are played. The digital asset segments are played in synchronization. In one embodiment, these digital asset segments are provided by at least two different media content providers. In various embodiments, each digital asset segment includes a time code and all the digital asset segments for the media content requested are played according to a reference time code such that various components of the media content are played synchronously. For example, the video component, the audio component, and the textual component (if any) of a movie are played synchronously. In further embodiments, any additional digital asset segments, on a needed basis, may be identified, located, and retrieved while the media content continues to be played.

Figure 5:
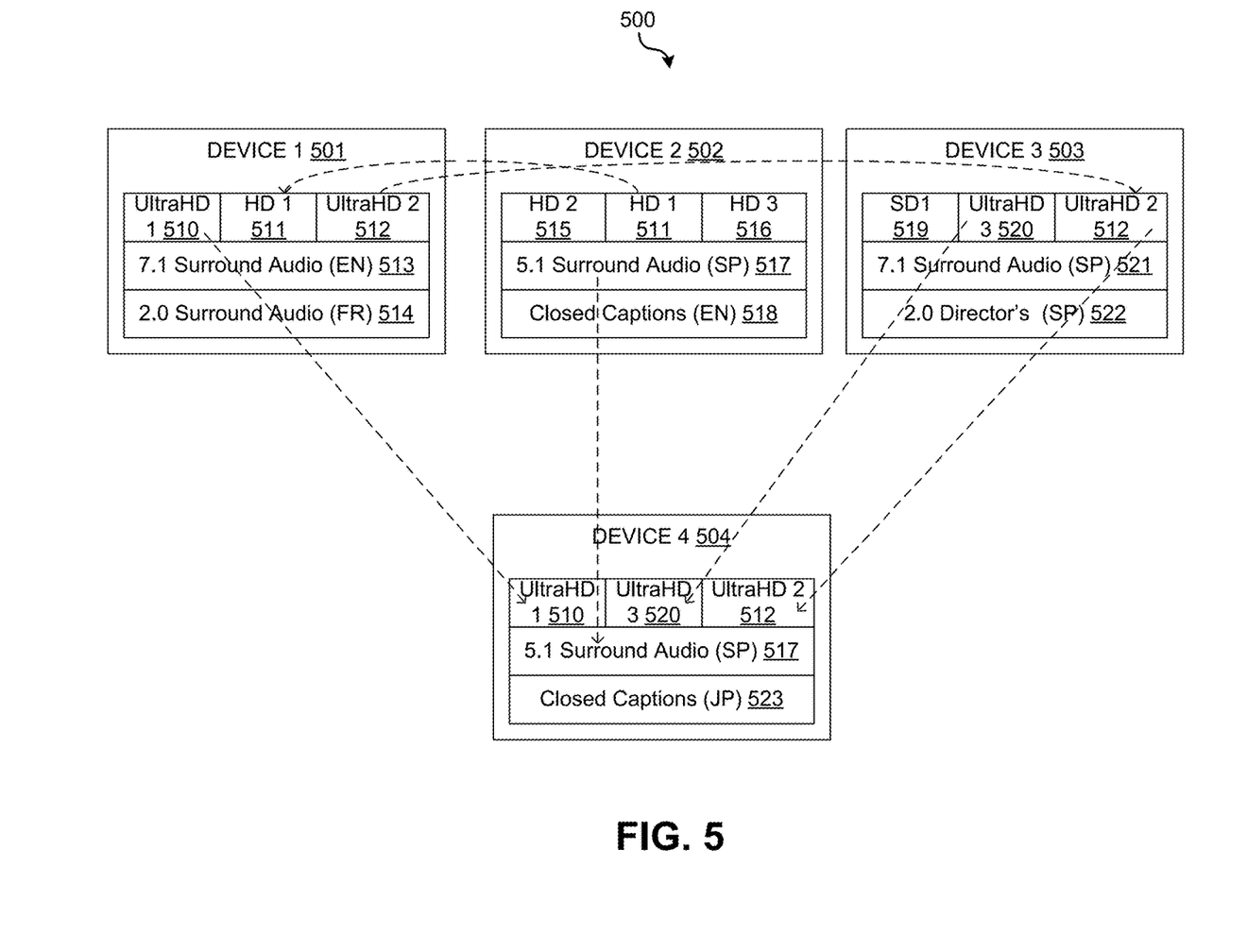
FIG. 5 illustrates an exemplary system of playing media content among various devices, such as the user system in FIG. 1.

FIG. 5 illustrates an exemplary system 500 of playing media content among various devices 501-504, such as the user system 112 in FIG. 1. The devices 501-504 belong to the same domain. The device 501 may be a smart TV or a setup box where the Ultra HD version of a media content is played. The Ultra HD version of the media content includes the digital assets such as an Ultra HD video, a 7.1 surround sound audio in English 513, and a 2.0 surround sound audio in French 514. In addition, the video digital assets are retrieved in segments. On the device 501, an Ultra HD video segment 510, an HD video segment 511, and an Ultra HD video segment 512 are retrieved. The HD video segment 511 is retrieved instead of the corresponding Ultra HD version due to various reasons such as the network bandwidth changes. The digital asset segments 510-512 may be retrieved from different digital asset providers.

In various embodiments, an index logging the association of each digital asset segment and the corresponding media source (e.g., a device) is created. In one embodiment, each device of a domain keeps a copy of the index. Each device may create and/or update an index upon receiving a digital asset segment. Whenever an index is created or updated, the most up-to-date index may be distributed among all devices of the domain. All the devices may update their local copy of the index according to the most up-to-date index that is distributed. In another embodiment, a domain coordinator maintains a copy of the index. The domain coordinator may be a device on the domain, or a system (e.g., the multi-source media content play system 101 in FIG. 1) that monitors the media content being distributed in the domain. Within one domain, the devices other than the domain coordinator does not keep a copy of the index. A device other than the domain coordinator may report to the domain coordinator that a digital asset segment is received, and the domain coordinator may update the index accordingly. In the illustrated example, the index comprises information such that the digital asset segments 510-512 and digital assets 513-514 may be obtained from the device 501.

The device 502 may be a laptop where a full HD version of the media content is played. The full HD version of the media content includes the digital assets such as an HD video, a 5.1 surround sound audio in Spanish 517, and a closed caption in English 518. The digital asset, the HD version of the video content, may be retrieved in segments. The segments 515 and 516 may be retrieved from one or more media content providers. The HD video segment 511 is retrieved from the device 501 as the index provides the information that the HD video segment 511 may be retrieved from the device 501. Furthermore, the log may be updated with the information such that the digital asset segments 515-516 as well as the segment 511 and the digital assets 517-518 may be obtained from the device 502.

In addition, the device 503 is another smart TV or a setup box where the Ultra HD version of the media content is played. The Ultra HD version of the media content includes an Ultra HD video, a 7.1 surround sound audio in English 521, and a 2.0 surround sound audio of the director's commentary in English 522. The digital asset which is the Ultra HD version of the video content may be retrieved in segments. The standard video segment 519 and the Ultra HD video segment 520 may be retrieved from one or more digital asset providers. The Ultra HD video segment 512 is retrieved from the device 501 as the index provides the information that the Ultra HD video segment 512 may be retrieved from the device 501. Furthermore, the index may be updated with the information such that the digital asset segments 512 and 519-520, and digital assets 521-522 may be obtained from the device 503.

In the illustrated system 500, the device 504 is another TV where a version of the media content is requested. The requested version includes digital assets such as an Ultra HD video, a 5.1 surround sound audio in Spanish 517, and a closed caption in Japanese 523. Each digital asset that is requested may be looked up in the domain. In one embodiment, the device 504 may look up the requested digital asset in its local copy of the index. The device 504 determines that the device 501 has copies of the Ultra HD video segments 510 and 512, the device 502 has a copy of the 5.1 surround sound audio in Spanish 517, and the device 503 has copies of the Ultra HD video segments 512 and 520, but the closed captions in Japanese 523 cannot be found in the domain. The device 504 retrieves (e.g., downloads or streams) the Ultra HD video segment 510 from the device 501, the 5.1 surround sound audio in Spanish 517 from the device 502, and the Ultra HD video segments 512 and 520 from the device 503. The device 504 further retrieves (e.g., downloads or streams) the closed caption in Japanese 523 from a media content provider. The index may be updated to indicate that the closed caption in Japanese 523 may be obtained from the device 304.

In the illustrated example, the digital asset segments 510, 520, and 512, as well as the digital assets 517 and 523 are retrieved from different media sources: the devices 501-503, and a media content provider. The digital asset segments 510, 520, and 512 as well as the digital assets 517 and 523 are played synchronously at device 504 to deliver the media content as requested by the user. These digital asset segments and digital assets may be played according to a reference time such that the video component (the digital asset segments Ultra HD video 510, 520, and 512), the audio component (the digital asset 5.1 surround audio in Spanish 517), and the textual component (the closed captions in Japanese 523) are synchronized when the device 504 plays the requested media content. In one embodiment, the digital asset segments 510, 520, and 512, and the digital assets 517 and 523 are provided by different media content providers. Additional digital asset or digital asset segments may be identified when the media content continues to be played on the device 504. The digital asset and the digital asset segments may be located and retrieved from various media sources and being played in synchronization with the digital asset segments 510, 520 and 512 and the digital assets 517 and 523.

Figure 6:
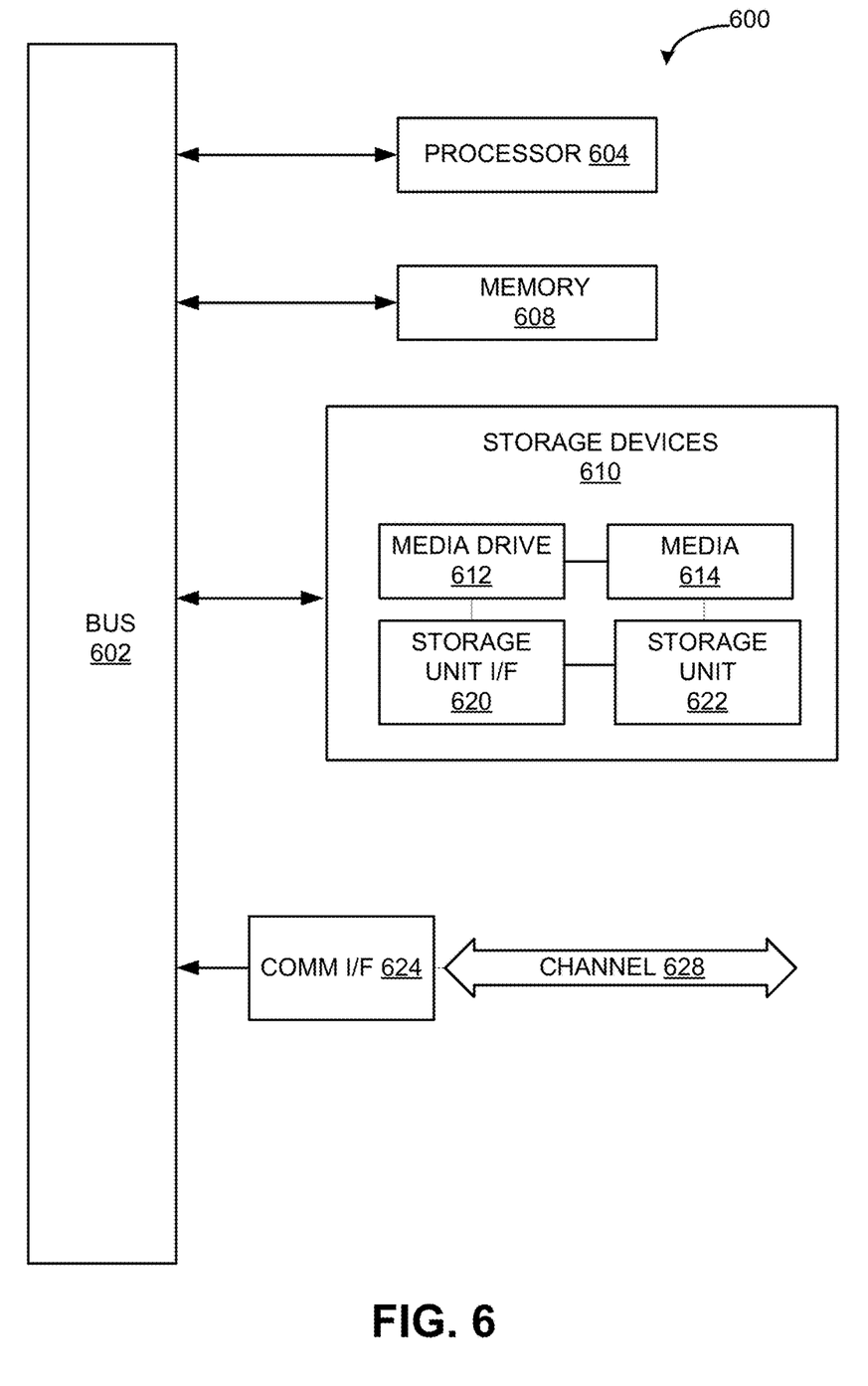
FIG. 6 illustrates an example computing module that may be used in implementing various features of embodiments of the application.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the application using other computing modules or architectures.

Referring now to FIG. 6, computing module 600 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, storage media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of playing pre-recorded digital assets from multiple media sources, comprising:
providing an interface through a multi-source media content play system application executing on a first device, the interface providing a list of available video files and audio files of a movie, wherein a first media source provides a first video file and a first audio file of the movie, a second media source provides a second video file and a second audio file of the movie;
receiving a request from a user through the interface to play a single instance of the movie on the first device, the request indicating a selection of the user to play the first video file of the movie from the first media source and the second audio file of the movie from the second media source;
locating and retrieving the first video file from the first media source and the second audio file from the second media source based on a manifest file maintained by the multi-source media content play system, the manifest file logging associations of each video file of the movie and each audio file of the movie available to the user with one or more devices upon being played on the one or more devices; and
playing the first video file and the second audio file of the movie in synchronization as the single instance of the movie through the multi-source media content play system application on the first device.

2. The computer-implemented method of claim 1, wherein the first video file and the second video file have different video formats.

3. The computer-implemented method of claim 1, wherein the first media source and the second media source comprise separate servers managed by separate media content providers.

4. The computer-implemented method of claim 1, wherein the first audio file and the second audio file have different audio content.

5. The computer-implemented method of claim 1, the associations of each video file comprises associating each video file with a medium access control (MAC) address of a media source of two or more media sources storing video files of the movie, and the associations of each audio file comprises associating each audio file with a MAC address of a media source of the two or more media sources storing audio files of the movie.

6. The computer-implemented method of claim 1, further comprising distributing the manifest file to one or more devices associated with the user.

7. The computer-implemented method of claim 1, wherein the first video file comprises a first time code and the second audio file comprises a second time code, and playing the first video file and the second audio file comprises aligning the first time code and the second time code to a reference time.

8. The computer-implemented method of claim 1, wherein the movie comprises at least one textual file, and the step of playing the first video file and the second audio file comprises detecting a request for a first textual file, locating and detecting the first textual file, and playing the first textual file in synchronization with the first video file and the second audio file.

9. A system for playing pre-recorded digital assets from multiple media sources, comprising:
a first device having a memory and a processor coupled to the memory, the memory storing a set of instructions configured to cause the processor to:
provide an interface through a multi-source media content play system application executing on the first device, the interface providing a list of available video files and audio files of the movie, wherein a first media source provides a first video file and a first audio file of the movie, a second media source provides a second video file and a second audio file of the movie;
receive a request from a user through the interface to play a single instance of the movie on the first device, the request indicating a selection of the user to play the first video file of the movie from the first media source and the second audio file of the movie from the second media source;
locate and retrieve the first video file from the first media source and the second audio file from the second media source based on a manifest file maintained by the multi-source media content play system, the manifest file logging associations of each video file of the movie and each audio file of the movie available to the user with one or more devices upon being played on the one or more devices; and
play the first video file and the second audio file of the movie in synchronization as a single instance of the movie through the multi-source media content play system.

10. The system of claim 9, wherein the first video file and the second video file have different video formats.

11. The system of claim 9, wherein the first media source and the second media source comprise separate servers managed by separate media content providers.

12. The system of claim 9, wherein the first audio file and the second audio file have different audio content.

13. The system of claim 9, the associations of each video file comprises associating each video file with a medium access control (MAC) address of a media source of two or more media sources storing video files of the movie, and the associations of each audio file comprises associating each audio file with a MAC address of a media source of the two or more media sources storing audio files of the movie.

14. The system of claim 9, wherein the set of instructions is further configured to cause the processor to distribute the manifest file to one or more devices associated with the user.

15. The system of claim 9, wherein the first video file comprises a first time code and the second audio file comprises a second time code, and the first set of instructions is configured to cause the first processor to align the first time code and the second time code to a reference time.

16. The system of claim 9, wherein the movie comprises at least one textual file, and the first set of instructions is configured to cause the first processor to detect a request for a first textual file, locate and detect the first textual file, and play the first textual file in synchronization with the first video file and the second audio file.

* * * * *